April 21, 1964　　　L. R. KELLY, JR　　　3,130,405
ELECTRONIC BEAT FREQUENCY TARGET SIMULATOR
Filed Nov. 14, 1962
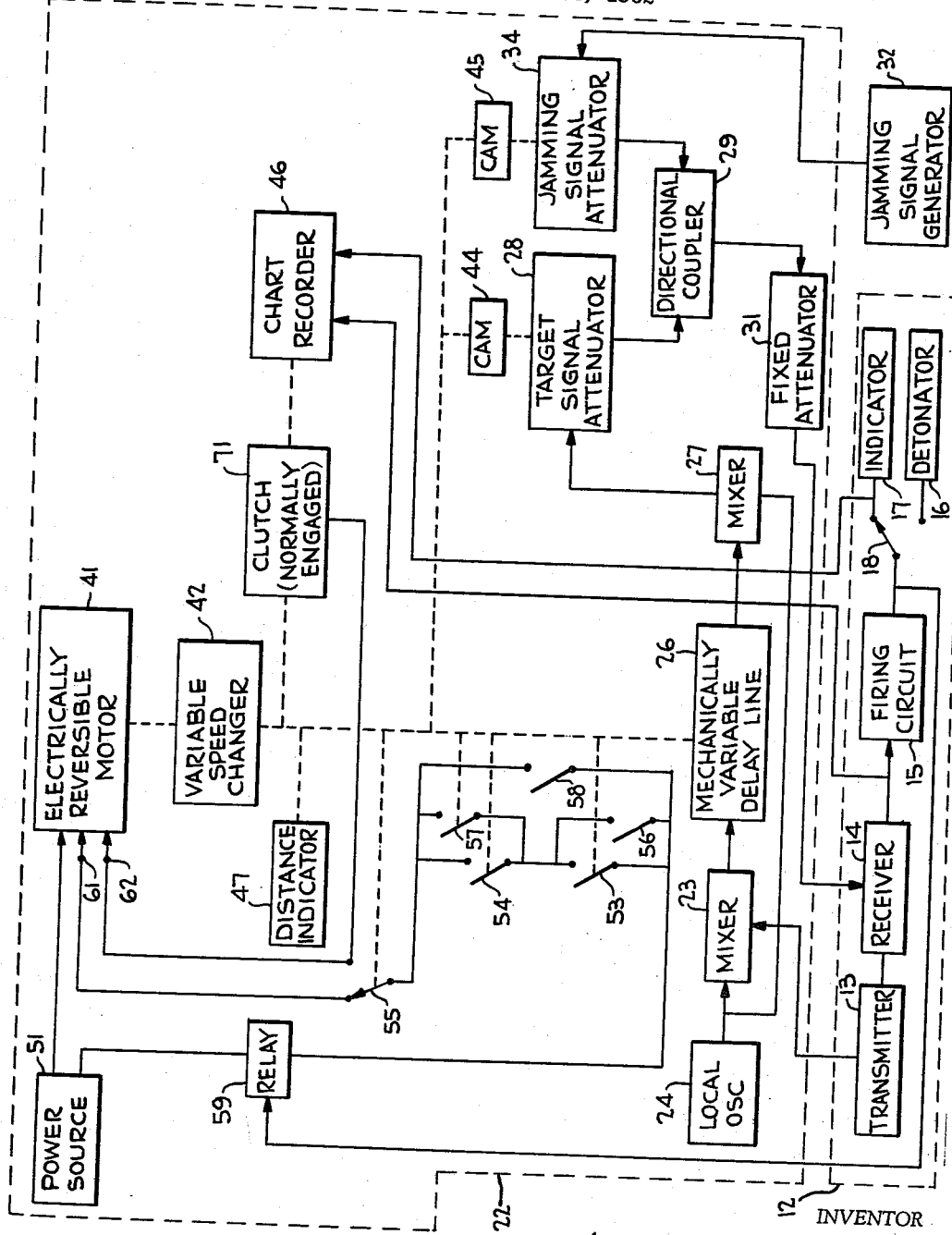
INVENTOR
LAWRENCE R. KELLY, Jr.
BY S. J. Rotondi, A. J. Dupont
& J. P. Edgerton
　　　　　ATTORNEYS United States Patent Office 3,130,405
Patented Apr. 21, 1964

3,130,405
ELECTRONIC BEAT FREQUENCY
TARGET SIMULATOR
Lawrence R. Kelly, Jr., Washington, D.C., assignor to the United States of America as represented by the Secretary of the Army
Filed Nov. 14, 1962, Ser. No. 237,770
5 Claims. (Cl. 343—17.7)
(Granted under Title 35, U.S. Code (1952), sec. 266)

The invention described herein may be manufactured and used by or for the Government of the United States of America for governmental purposes without the payment to me of any royalty thereon.

This invention relates to the testing of radio-type distance-measuring devices and more specifically to an improved device for the nondestructive testing of radio-type ordnance proximity fuzes.

A principal object of the invention is to provide a convenient and economical device for the rapid and efficient testing of radio-type ordnance proximity fuzes under conditions simulating the conditions experienced by an ordnance fuze as it approaches a target.

In a typical embodiment of the invention, a target simulator assembly is provided for connection to an ordnance fuze to be tested and to an external jammer signal generator. The fuze to be tested includes a radio transmitter, a radio receiver for sensing a signal returned from a target, and a firing circuit connected to the output of the radio receiver and responsive to a returned signal that is characteristic of a desired target. The simulator takes the signal from the transmitter and mixes it with a signal from a fixed-frequency local oscillator to obtain a difference-frequency signal. This difference-frequency signal is passed through a mechanically variable delay line and then mixed with a signal from the same local oscillator to obtain a delayed version of the transmitter signal. This delayed signal is passed through a variable target signal attenuator and returned to the receiver input of the fuze. Simultaneously, a signal from an external jammer signal generator is fed through a variable jamming signal attenuator contained in the target simulator assembly and is applied to the receiver input of the fuze. An electrically reversible electric motor is coupled through appropriate mechanical linkages to the mechanically-variable delay line and also to the target signal attenuator, the jamming signal attenuator, a distance indicator, and a chart recorder. When a test is to be made a pushbutton switch is depressed to start the motor. The motor advances the delay line from its maximum-delay (maximum fuze-to-target distance) to its minimum-delay (minimum fuze-to-target distance) position at a predetermined rate, and simultaneously varies the target signal attenuator and the jammer signal attenuator at the proper rates to correspond to change in simulated fuze-to-target distance. When the motor has driven the delay line to the minimum delay (minimum distance) position the motor automatically reverses, and returns the delay line and attenuators to their maximum-distance or standby position. The distance indicator provides a continuous visual indication of fuze-to-target distance, while the chart recorder makes a permanent record of firing circuit output and other fuze parameters as functions of fuze-to-target distance.

Other objects, aspects, uses, and advantages of the invention will become apparent from the following description and from the drawing.

The drawing is a schematic diagram of a preferred target simulator in accordance with the invention, connected to a fuze to be tested and to an external jammer signal generator.

In the drawing, solid lines represent electrical paths, while dotted lines represent mechanical drives or linkages.

In the drawing a conventional radio-type ordnance proximity fuze 12 comprises a transmitter 13, a receiver 14, a firing circuit 15, a detonator 16, and an indicator 17. As is conventional, fuze 12 is designed so that a signal radiated from the transmitter 13 and reflected back to receiver 14 from a target, will, if conditions are correct and if the fuze is functioning properly, actuate a firing circuit 15 capable of firing a detonator 16. A switch 18 is provided to permit switching the firing signal from circuit 15 to an indicator 17, instead of to detonator 16, for test purposes. Indicator 17 may be a light that goes on in response to a firing signal from circuit 15.

Target simulator 22 comprises a first mixer 23 in which a signal from transmitter 13 is mixed with a signal from a local oscillator 24. A difference frequency signal from mixer 23 is fed through mechanically variable delay line 26 to a second mixer 27 where it is mixed with a signal from local oscillator 24. The output of mixer 27, which is a signal of the frequency of transmitter 13 delayed by the delay line 26, is fed through a target signal attenuator 28, a directional coupler 29, and a fixed attenuator 31, to the input terminal of receiver 14. A signal from an external jammer signal generator 32 is fed through a jamming signal attenuator 34, directional coupler 29, and fixed attenuator 31, to the input terminal of receiver 14. The function of directional coupler 29 is to couple the target and jammer signal to the input terminal of receiver 14 from attenuators 28 and 34 while avoiding interaction between the attenuators.

Coming now to the mechanical elements of simulator 22, an electrically reversible motor 41 drives a variable speed changer 42 which in turn drives variable delay line 26, target signal attenuator 28, and jamming signal attenuator 34 through cams 44 and 45 respectively. Speed changer 42 also drives a chart recorder 46 and a distance indicator 47, which simply measures the rotation of the linkage that varies the delay line. Indicator 47 includes a dial calibrated in distance units.

Chart recorder 46 is of a conventional type. The chart paper is advanced by the mechanical output of variable speed changer 42. The purposes of the speed changer is to provide the various required simulated velocities. Several recording pens are provided and are driven by electrical signals from the output of receiver 14, the output of firing circuit 15, and any other electrical signals that may be of interest for purposes of analysis of fuze operation.

Application of electrical input power to motor 41, from an electrical power source 51, is controlled by relay 59, switch 55, near limit switch 53 and far limit switch 54. Switches 56, 57 and 58 make it possible in conjunction with the above mentioned switches to give various switching schemes and sequences. In the normal condition of simulator 22, ready to begin a test, variable delay line 26 is at its maximum delay, or maximum distance, position. In this standby condition, near limit switch 53 is open, far limit switch 54 is closed, switch 57 is closed, switch 58 is open, relay 59 is closed, and no power is supplied to motor 41. To begin a test, momentary pushbutton switch 56 is momentarily depressed, applying electrical power through switch 55 to terminal 61 of motor 41. This starts motor 41 rotating in the direction that will move variable delay line 26 to its minimum delay, or near distance, limit. As soon as the output shaft of motor 41 has rotated a small amount, limit switch 53 closes and delay line 26 is driven towards its minimum delay until a firing signal is derived from firing circuit 15 and applied to relay 59. Relay 59 is of a latching type that opens in response to a pulse and remains open until closed mechanically. Relay 59 disconnects the electrical power from power source 51 to motor 41 thereby stopping all mechanical motion and thus making possible direct read-out from distance indicator 47. Relay 59 is then closed mechanically and motor 41 continues to drive delay line to its minimum delay, or minimum distance. At minimum delay position of delay line 26 for limit switch 54 opens and switch 55 transfers the input power for motor 41 from terminal 61 to terminal 62, thereby reversing motor 41. Simultaneously with reversing motor 41, switch 55 applies electrical energy to electrically-controlled clutch 71, thereby disengaging chart recorder 46 from the mechanically driven organization comprising motor 41 and speed changer 42. Recorder 46 is thus not moved backward. When motor 41 has brought delay line 26 to its maximum delay limit, switch 53 and switch 55 are activated simultaneously. Switch 55 transfers the input power for motor 41 from terminal 62 to terminal 61 and switch 53 opens and removes the input power from motor 41. Simulator 22 is now in its original or standby condition. Another test can now be made automatically simply by pressing push button switch 56 momentarily.

To simulate a jamming signal originating at or near the target, jamming signal attenuator 34 should cause the strength of the jamming signals, as received by the fuze, to vary inversely as the square of fuze-to-target distance. Because the target signal is transmitted from the fuze and reflected to the fuze from the target, target signal attenuator 28 is designed to cause the target signal strength, as seen by the fuze, to vary inversely as the fourth power of fuze to target distance. In the light of the foregoing disclosure, skilled persons will have no difficulty in arranging attenuators to obtain the required relation between the attenuation provided by attenuators 28 and 34 and the delay provided by delay lines 26. Various suitable forms of mechanically variable delay line 26 are known to the art. A convenient form of mechanically variable delay line 26 consists of a length of coaxial cable sufficiently long to provide the maximum desired delay, tapped at frequent intervals, together with a mechanically rotatable selector switch for connecting to one tap after another.

It will be apparent that simulator 22 can be used to test fuzes and related devices operating on a wide range of frequencies and with various types of modulation. An important design consideration is the maximum band width of the modulation of fuzes to be tested. Delay line 26 is designed to operate at a frequency sufficiently high to pass the maximum modulation band widths expected to be encountered. The frequency of local oscillator 24 is then fixed in the required relationship to the center or carrier frequency of the fuze.

It will be apparent that the embodiment shown is only exemplary and that various modifications can be made in construction and arrangement within the scope of the invention as defined in the appended claims.

I claim as my invention:

1. Apparatus for testing a radio-type distance responsive device having a radio transmitter and having a radio receiver responsive to a signal returned from a target, said apparatus comprising:
    (a) an input terminal for connection to the output of said transmitter,
    (b) a local oscillator,
    (c) a first mixer for mixing the output of said transmitter with a signal from said local oscillator,
    (d) a variable delay line connected to the output of said first mixer,
    (e) a second mixer for mixing the output of said variable delay line with a signal from said local oscillator to obtain a delayed transmitter-frequency signal,
    (f) means for coupling said delayed transmitter-frequency signal to said receiver, and
    (g) means for varying the delay of said line, and
    (h) means, responsive to said means for varying the delay, for variably attenuating said delayed signal so as to maintain a predetermined relationship between delay and attenuation.

2. The invention in accordance with claim 1, there being additionally provided:
    (a) means for connecting a jamming signal, from a jamming generator, through said apparatus, to the input of said receiver,
    (b) means, responsive to said means for varying the delay, for variably attenuating the jamming signal so as to maintain a predetermined relationship between delay and attenuation.

3. The invention in accordance with claim 1 comprising additionally:
    (a) an electric motor,
    (b) means responsive to said electric motor for actuating said means for varying the delay,
    (c) a height counter responsive to the position of said means for varying the delay,
    (d) a chart recorder responsive to the position of said means for varying the delay and to at least one electrical signal associated with said receiver.

4. The invention in accordance with claim 2 comprising additionally:
    (a) an electric motor,
    (b) means responsive to said electric motor for actuating said means for varying the delay,
    (c) a height counter responsive to the position of said means for varying the delay,
    (d) a chart recorder responsive to the position of said means for varying the delay and to at least one electrical signal associated with said receiver.

5. The invention in accordance with claim 4 comprising additionally:
    (a) a source of electrical power for said electric motor;
    (b) push-button means for starting said electric motor from a standby condition in which said delay line is at its maximum delay limit;
    (c) first automatic switch means, responsive to the advance of said delay line, for keeping power applied to said motor.
    (d) second automatic switch means for reversing said motor when said delay line reaches its minimum-delay limit; and
    (e) automatic means for shutting off said motor and restoring the initial standby condition when the delay line has been returned to its maximum delay limit.

No references cited.